(12) United States Patent
Uramachi

(10) Patent No.: US 7,712,361 B2
(45) Date of Patent: May 11, 2010

(54) FLOW RATE MEASURING APPARATUS HAVING A RESIN PLATE FOR SUPPORTING A FLOW RATE DETECTING ELEMENT AND A CIRCUIT BOARD

(75) Inventor: Hiroyuki Uramachi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/966,157

(22) Filed: Dec. 28, 2007

(65) Prior Publication Data

US 2009/0000366 A1  Jan. 1, 2009

(30) Foreign Application Priority Data

Jun. 29, 2007  (JP) ............................. 2007-172466

(51) Int. Cl.
*G01F 1/68* (2006.01)
(52) U.S. Cl. .................................. 73/204.22
(58) Field of Classification Search ............ 73/202, 73/202.5, 204.11–204.27
See application file for complete search history.

(56) References Cited

U.S. PATENT DOCUMENTS

| | | | |
|---|---|---|---|
| 5,693,879 A | | 12/1997 | Rilling et al. |
| 5,780,735 A | * | 7/1998 | Kadohiro et al. ............ 73/202.5 |
| 6,182,639 B1 | * | 2/2001 | Igarashi et al. ............... 123/494 |
| 6,516,785 B1 | * | 2/2003 | Nakada et al. ............... 123/494 |
| 6,557,410 B2 | * | 5/2003 | Uramachi et al. ......... 73/204.22 |
| 6,612,167 B2 | * | 9/2003 | Kamiya .................... 73/204.22 |
| 6,640,627 B2 | * | 11/2003 | Sato et al. ................. 73/204.22 |
| 6,666,082 B2 | * | 12/2003 | Watanabe et al. ......... 73/204.22 |
| 6,679,113 B2 | * | 1/2004 | Uramachi ................. 73/204.22 |
| 6,708,560 B2 | * | 3/2004 | Watanabe et al. ......... 73/204.22 |
| 6,854,326 B2 | * | 2/2005 | Watanabe et al. ......... 73/204.22 |
| 6,912,899 B2 | * | 7/2005 | Satou et al. ............... 73/204.22 |
| 7,062,964 B2 | * | 6/2006 | Saito et al. ................ 73/204.22 |

(Continued)

FOREIGN PATENT DOCUMENTS

JP    9503311    3/1997

(Continued)

OTHER PUBLICATIONS

Japanese Office Action dated Apr. 22, 2009.

(Continued)

*Primary Examiner*—Harshad Patel
(74) *Attorney, Agent, or Firm*—Sughrue Mion, PLLC

(57) ABSTRACT

A flow rate measuring apparatus can reduce flow rate detection errors resulting from a temperature difference between an inside and an outside of piping. A base has a base main body which is formed at its base end with a connector protruding to the outside of the piping, and a flange which is formed on the base main body and is fitted into an insertion hole in the piping. A plate made of PBT resin is arranged on the base, and a flow rate detection element is formed on the plate so as to be exposed therefrom. A circuit board is arranged at a side of the plate opposite to the connector. A housing has a fluid passage groove that cooperates with the plate to form a measuring passage in which the flow rate detection element is disposed, and an enclosure portion enclosing the circuit board. A cover closes the enclosure portion.

9 Claims, 11 Drawing Sheets

U.S. PATENT DOCUMENTS

| | | | |
|---|---|---|---|
| 7,219,544 B2* | 5/2007 | Tanaka et al. | 73/204.26 |
| 7,293,457 B2* | 11/2007 | Uramachi et al. | 73/204.22 |
| 2002/0023486 A1* | 2/2002 | Watanabe et al. | 73/202.5 |
| 2002/0069699 A1* | 6/2002 | Sato et al. | 73/204.22 |
| 2002/0092349 A1* | 7/2002 | Watanabe et al. | 73/204.22 |
| 2004/0060354 A1* | 4/2004 | Watanabe et al. | 73/204.22 |

FOREIGN PATENT DOCUMENTS

| | | |
|---|---|---|
| JP | 11-14423 A | 1/1999 |
| JP | 2001-124606 A | 5/2001 |
| JP | 2006-153694 | 6/2006 |
| JP | 2006153694 | 6/2006 |
| JP | 2006-283765 | 10/2006 |
| JP | 2006283765 | 10/2006 |
| KR | 10-0390718 | 9/2003 |

OTHER PUBLICATIONS

Korean Office Action dated Aug. 17, 2009.

* cited by examiner (A)

(B)

(C)

(D)

(A)

(B)

(C)

(D)

(A)

(B)

(C)

(D)

(A)

(B)

(C)

(D)

(A)

(B)

FLOW RATE MEASURING APPARATUS HAVING A RESIN PLATE FOR SUPPORTING A FLOW RATE DETECTING ELEMENT AND A CIRCUIT BOARD

BACKGROUND OF THE INVENTION

1. Field of the Invention

The present invention relates to a flow rate measuring apparatus that is installed, for example, by insertion into an insertion hole formed in an intake pipe for measuring the flow rate of air that passes through a piping passage in the intake pipe.

2. Description of the Related Art

In FIGS. 1 and 2 of a first patent document (Japanese patent application laid-open No. H11-14423), there is shown a flow rate measuring apparatus that has a housing portion 3 containing therein a circuit board 6 on a metal base 5, and an auxiliary passage member 4 formed separately from each other. This housing 3 made of resin includes a frame portion 31, a connector portion 32 that has a connector terminal 33 embedded therein, a stationary portion 34 that fixedly secures a plurality of support terminals 35 supporting a heat generation resistor 1 and a thermally sensitive resistor 2, and a fixed flange 36.

The metal base 5 covers an opening face at one side of a cavity in the housing 3 together with an opening face of an auxiliary air passage at which one side of the auxiliary passage member 4 is opened, and at the same time, it is fixedly attached to the frame portion 31 and the auxiliary passage member 4.

The heat generation resistor 1 and the thermally sensitive resistor 2 arranged in the auxiliary passage member 4 is spaced from the metal base 5, and is electrically connected to the circuit board 6 through the support terminals 35.

In addition, another flow rate measuring apparatus is shown in FIG. 3 of a second patent document (Japanese patent application laid-open No. 2001-124606). A module housing 4 is arranged on a metal base 5, and a heat generation resistor 7, a temperature sensitive resistor 8 and an intake air temperature sensor 9 are fixedly secured by spot welding to and electrically connected to a support terminal 2 that is integrally molded with the module housing 4.

In this flow rate measuring apparatus, the heat generation resistor 7, the temperature sensitive resistor 8 and the intake air temperature sensor 9 are disposed in the auxiliary air passage 12 that is formed by the metal base 5 and bypass molding 10.

The flow rate measuring apparatus described in the above-mentioned first patent document is influenced by the heat of a flow meter body 86 itself other than a thermal influence due to the own heat of electronic circuit parts.

The influence of the heat of the flow meter body 86 is that when the temperature of air flowing through the hollow interior of the flow meter body 86 becomes low while the temperature of the flow meter body 86 is high, the heat of the flow meter body 86 is transmitted to the heat generation resistor 1 and the thermally sensitive resistor 2, whereby a detection error becomes large due to the influence of the heat thus transmitted.

In case of an intake pipe of an automotive internal combustion engine, the intake air in the interior of the intake pipe is in a cold state when the temperature of the outside air is low, but the intake pipe itself might become a warm state by receiving a thermal influence of the internal combustion engine.

In case where such a kind of flow rate measuring apparatus is applied to a fuel injection system of such an automotive internal combustion engine, there arises the following problem. That is, the heat of the intake pipe is transmitted to the heat generation resistor 1 and the thermally sensitive resistor 2 through the metal base 5 and the support terminal 35, thus resulting in a cause of a flow rate detection error.

Moreover, similarly, in the flow rate measuring apparatus described in the above-mentioned second patent document, too, there has been the following problem. That is, the heat of the intake pipe or the heat due to own heat generation of the circuit board 6 in the module housing 4 installed in the intake pipe is transmitted to the heat generation resistor 7 and the temperature sensitive resistor 8 through the metal base 5 and the support terminal 2, thus resulting in a cause of a flow rate detection error.

Further, the flow rate measuring apparatus described in the above-mentioned first patent document is fixedly secured to the flow meter body 86, which forms the main air passage 81, by means of the fixed flange 36 of the housing 3 through the metal base 5, but the flow rate measuring apparatus at this time is of a cantilever structure in which the fixed flange 36 is fixedly supported at its base end portion with its tip end portion being free.

Thus, there has also been the following problem. That is, when the flow meter body 86 is caused to vibrate, a concentrated stress is generated in the vicinity of the fixed flange 36 among fixedly secured portions between the metal base 5 and the housing 3, so in the fixed portions at this location, the metal base 5 might be peeled off from the housing 3, or an electrically conductive lead 7 electrically connecting the circuit board 6 and the support terminals 35 to each other might be broken or disconnected.

SUMMARY OF THE INVENTION

Accordingly, the present invention is intended to obviate the problems as referred to above, and has for its object to obtain a flow rate measuring apparatus which is capable of reducing flow rate detection errors resulting from a temperature difference in the inside and outside of piping, and of reducing the occurrence of a break or disconnection of an electric line or lead resulting from the vibration of the piping.

Bearing the above object in mind, according to the present invention, there is provided a flow rate measuring apparatus which is installed on piping by insertion thereof into an insertion hole formed in the piping for measuring a flow rate of fluid to be measured that passes through a piping passage defined in the piping. The flow rate measuring apparatus includes: a base that has a base main body which is formed at its base end portion with a connector protruding to an outside of the piping, and a flange which is formed on the base main body and is fitted into the insertion hole; a plate that is made of resin and is attached to the base main body along a direction of flow of the fluid to be measured; a flow rate detection element that is formed on the plate so as to be exposed therefrom for detecting the flow rate of the fluid to be measured; a circuit board that is arranged on the plate at a side thereof near the connector and has a control circuit built therein for driving the flow rate detection element to process a signal of the flow rate detection element; a housing that is attached to the plate and is formed respectively with a fluid passage groove to cooperate with the plate to form a measuring passage which serves to guide the fluid to be measured and in which the flow rate detection element is disposed, and an enclosure portion which encloses the circuit board; and a cover that closes the enclosure portion.

According to the flow rate measuring apparatus of the present invention, there are obtained the following advantageous effects. That is, flow rate detection errors resulting from a difference in temperature between the inside and outside of piping can be reduced, and the occurrence of a break or disconnection of an electric line or lead resulting from the vibration of the piping can be reduced.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
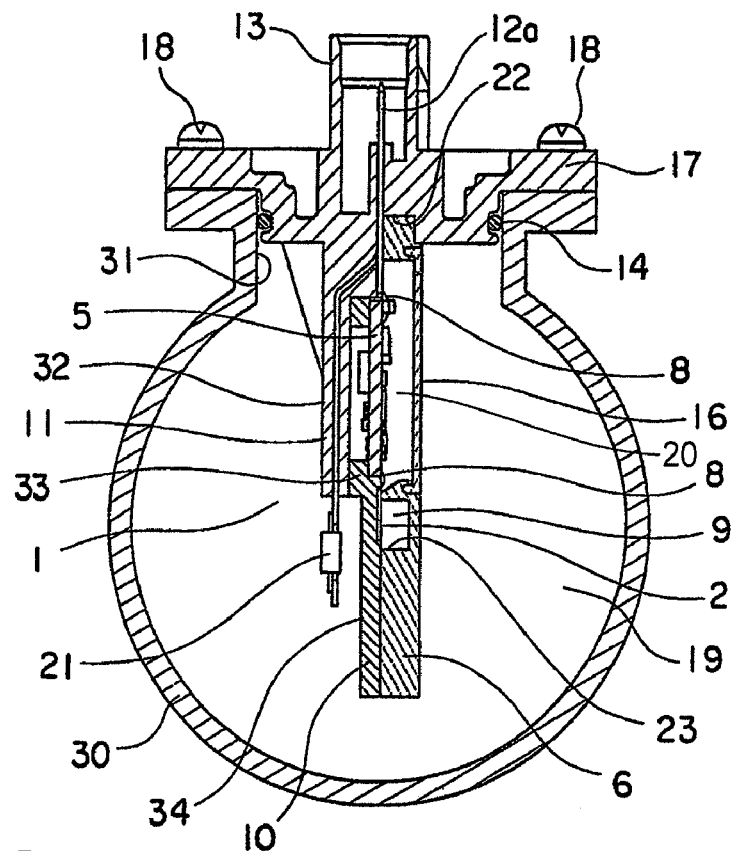
FIG. 1 is a cross sectional side view showing a flow rate measuring apparatus according to a first embodiment of the present invention.

Now, preferred embodiments of the present invention will be described in detail while referring to the accompanying drawings. Throughout respective figures, the same or corresponding members or parts are identified by the same reference numerals and characters.

Here, note that the reference numerals and characters attached in the explanation of the individual embodiments are not related to those used in the "description of the related art" section.

Embodiment 1

Figure 2:
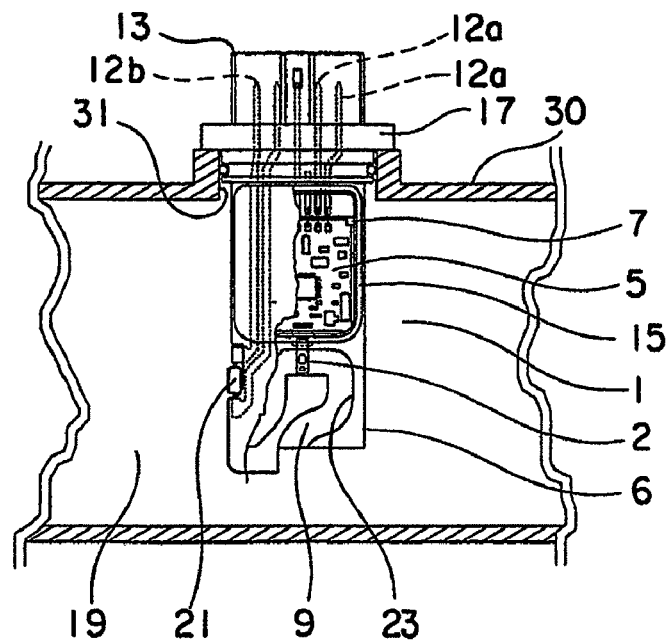
FIG. 2 is a partially cut-away front elevational view of the flow rate measuring apparatus of FIG. 1.
Figure 3:
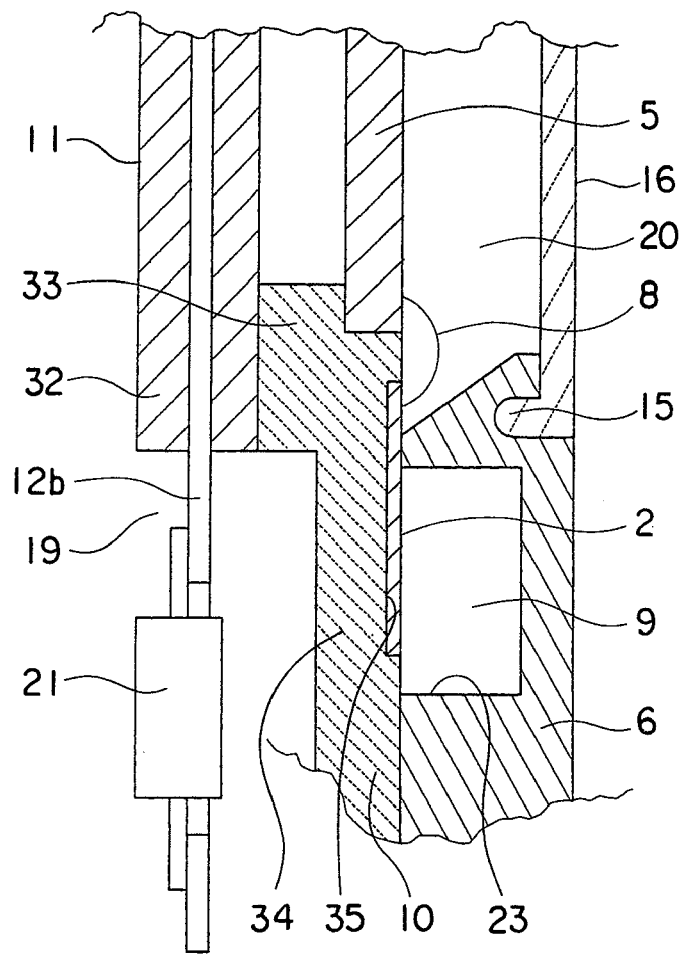
FIG. 3 is an enlarged view of essential portions of the flow rate measuring apparatus of FIG. 1.
Figure 4:
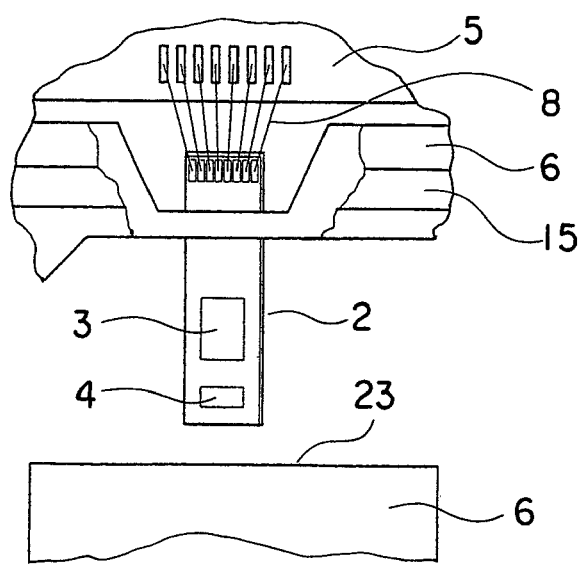
FIG. 4 is an enlarged view of essential portions of the flow rate measuring apparatus of FIG. 2.
Figure 5:
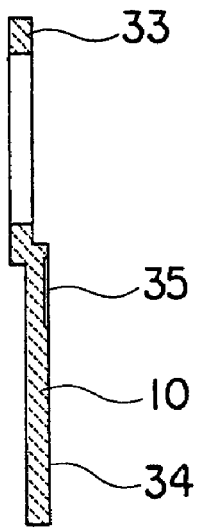
FIG. 5(A) is a cross sectional side view of a plate shown in FIG. 1.
FIG. 5(B) is a front elevational view of FIG. 5(A).
FIG. 5(C) is a side elevation of a circuit board and a flow rate detection element shown in FIG. 1.
FIG. 5(D) is a front elevational view of FIG. 5(C).
Figure 5:
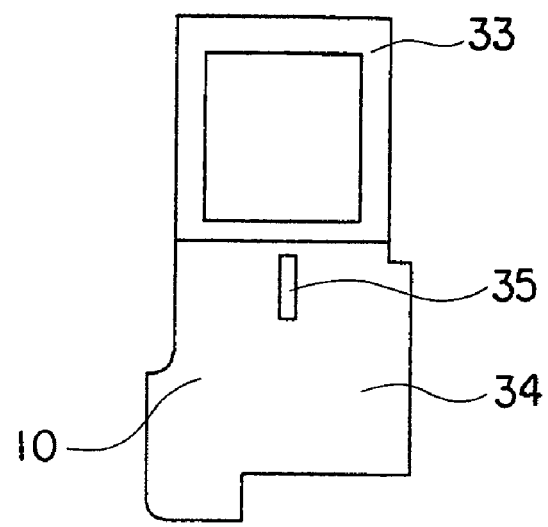
Figure 5:
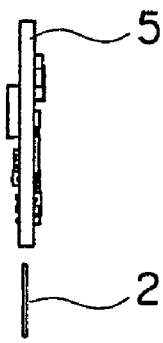
Figure 5:
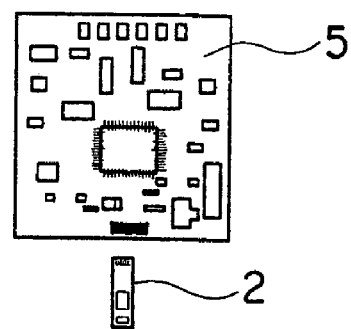
Figure 6:
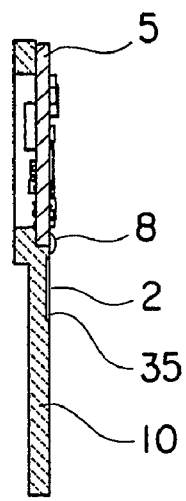
FIG. 6(A) is a cross sectional side view of the circuit board and the flow rate detection element bonded to the plate shown in FIG. 1.
FIG. 6(B) is a front elevational view of FIG. 6(A).
FIG. 6(C) is a cross sectional side view of a base shown in FIG. 1.
FIG. 6(D) is a front elevational view of FIG. 6(C).
Figure 6:
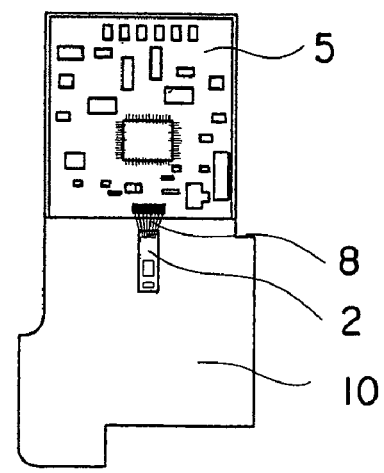
Figure 6:
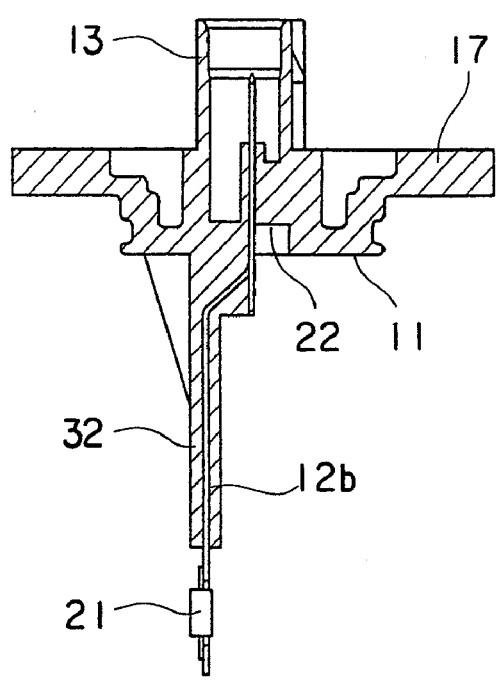
Figure 6:
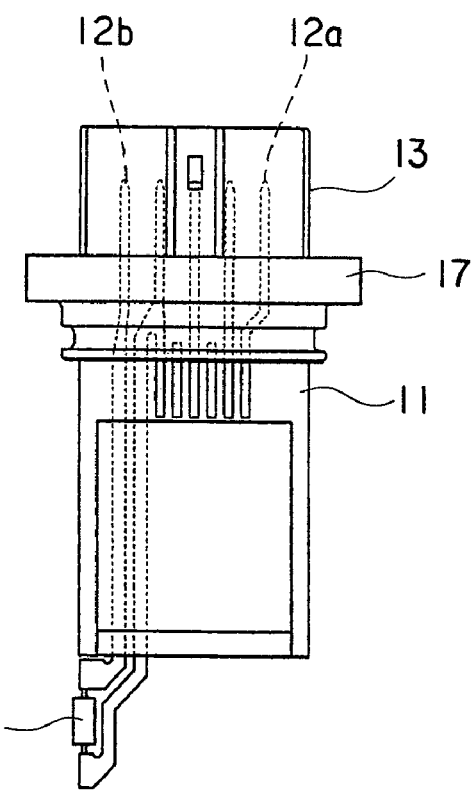
Figure 7:
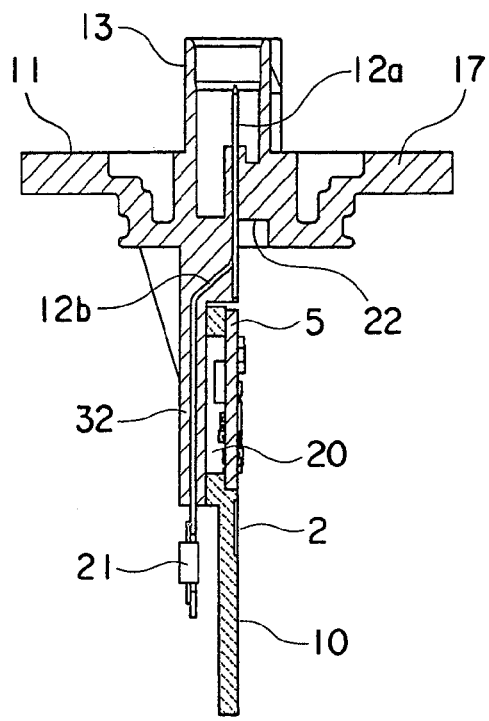
FIG. 7(A) is a cross sectional side view when the plate shown in FIG. 6(A) is bonded to the base shown in FIG. 6(C).
FIG. 7(B) is a front elevational view of FIG. 7(A).
FIG. 7(C) is a cross sectional side view of a housing shown in FIG. 1.
FIG. 7(D) is a front elevational view of FIG. 7(C).
Figure 7:
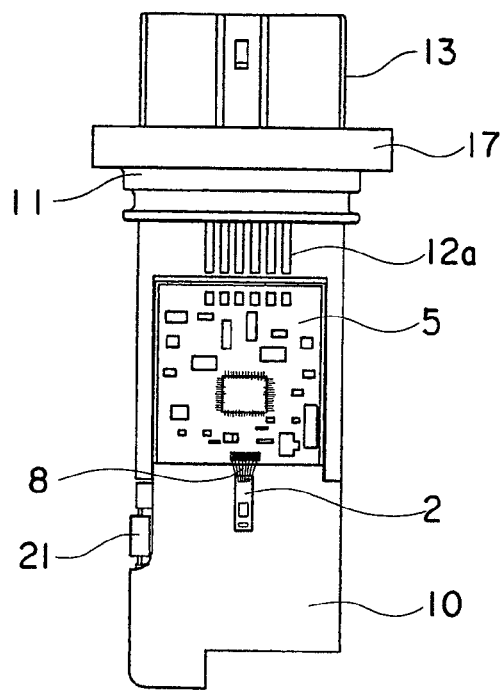
Figure 7:
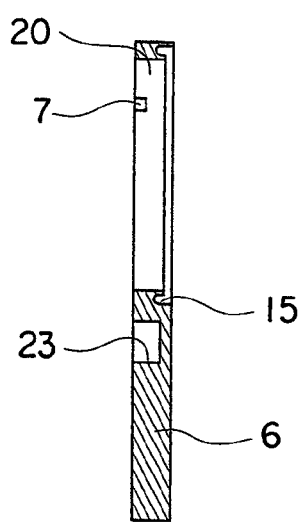
Figure 7:
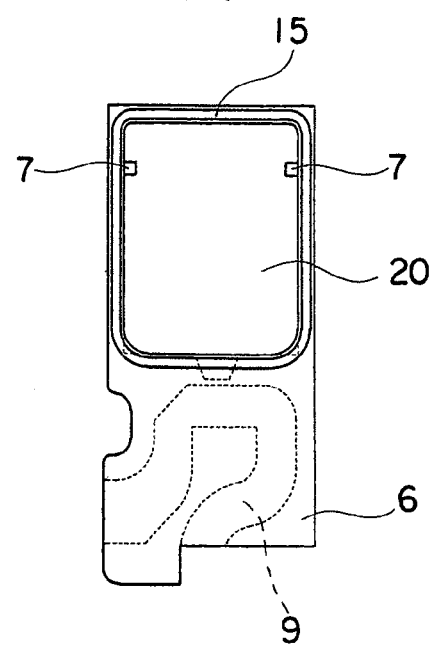
Figure 8:
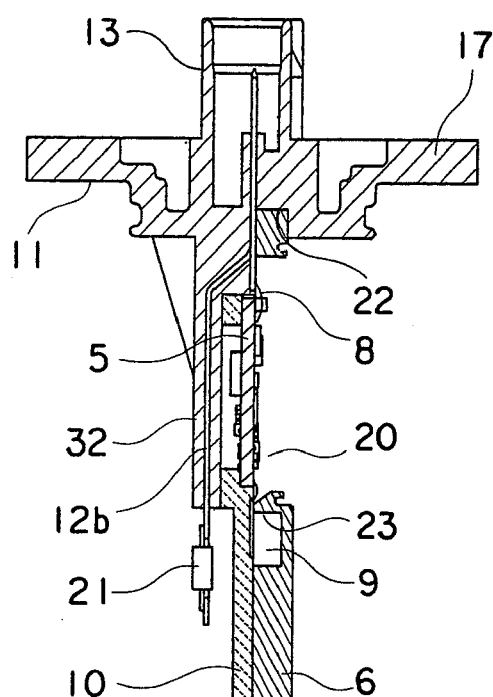
FIG. 8(A) is a cross sectional side view when the housing shown in FIG. 7(C) is bonded to the plate shown in FIG. 7(A).
FIG. 8(B) is a front elevational view of FIG. 8(A).
FIG. 8(C) is a cross sectional side view of a cover shown in FIG. 1.
FIG. 8(D) is a front elevational view of FIG. 8(C)
Figure 8:
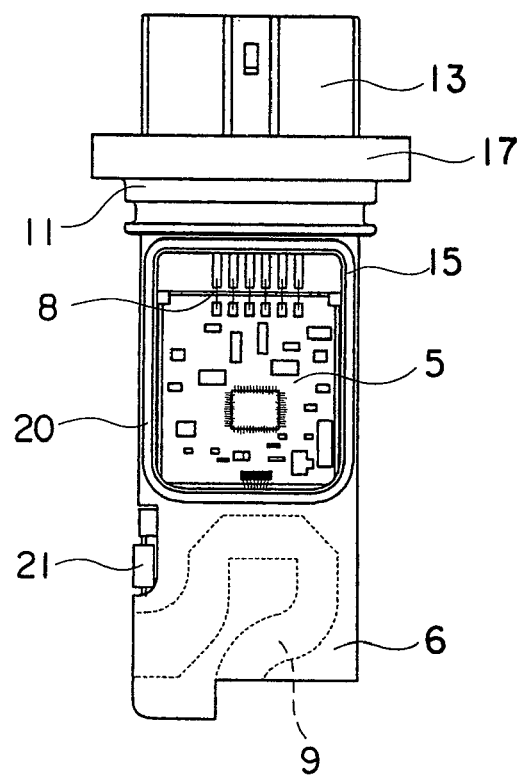
Figure 8:
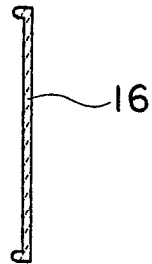
Figure 8:
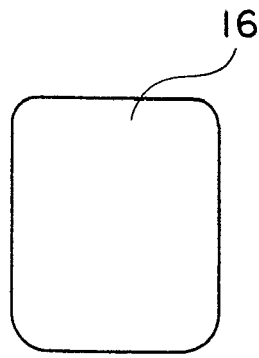
Figure 9:
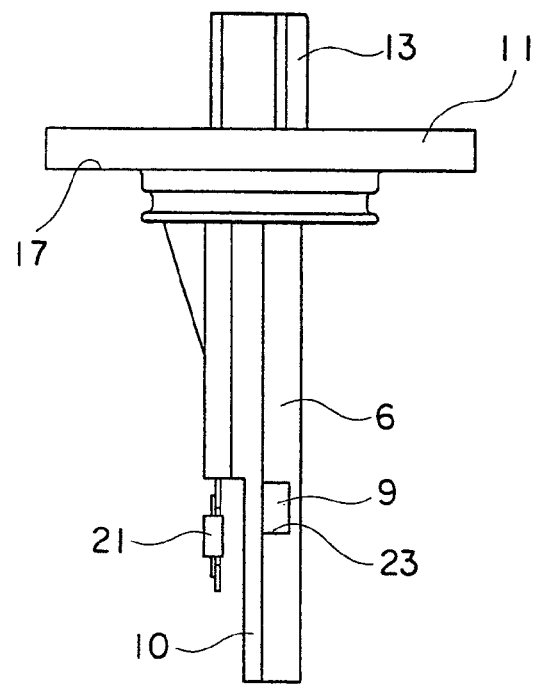
FIG. 9(A) is a side elevation of the flow rate measuring apparatus shown in FIG. 1.
FIG. 9(B) is a front elevational view of FIG. 9(A).
Figure 9:
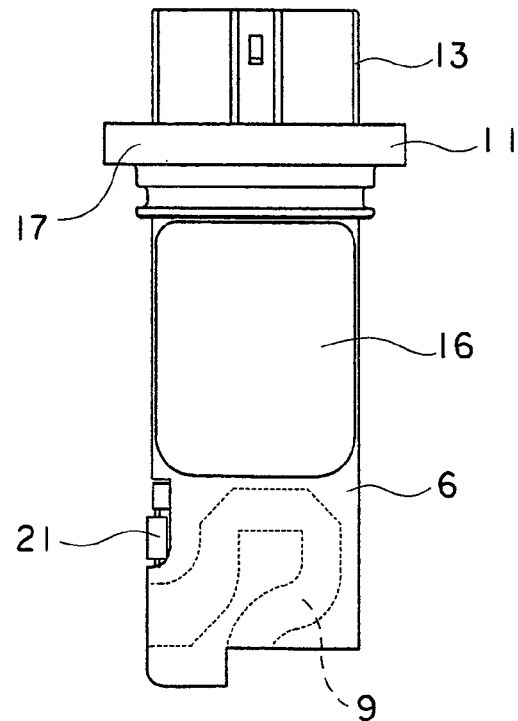

Referring to the drawings and first to FIG. 1, there is shown a cross sectional side view of a flow rate measuring apparatus according to a first embodiment of the present invention. FIG. 2 is a partially cut-away front elevational view of the flow rate measuring apparatus of FIG. 1. FIG. 3 is an enlarged view of essential portions of the flow rate measuring apparatus of FIG. 1, and FIG. 4 is an enlarged view of essential portions of the flow rate measuring apparatus of FIG. 2.

An intake pipe 30 of the internal combustion engine has an insertion hole 31 formed therein, and the flow rate measuring apparatus, generally designated at reference numeral 1, is inserted into the insertion hole 31 and installed on the intake pipe 30.

This flow rate measuring apparatus 1 includes a base 11, a plate 10 that is attached or bonded to the base 11 along a flow direction of air in the form of a fluid to be measured, a flow rate detection element 2 that is formed on the plate 10 so as to be exposed therefrom for detecting the flow rate of air, and a circuit board 5 that is mounted on a surface of the plate 10 on the same side thereof as that side at which the flow rate detection element 2 is mounted, and has a control circuit built therein for driving the flow rate detection element 2 to process a signal of the flow rate detection element 2.

Also, the flow rate measuring apparatus 1 further includes: a housing 6 that is attached or bonded to the plate 10 and is formed with a fluid passage groove 23 to cooperate with the plate 10 to form a measuring passage 9 which serves to guide air and in which the flow rate detection element 2 is disposed, and an enclosure portion 20 that serves to enclose the circuit board 5; and a cover 16 that closes the enclosure portion 20.

The above-mentioned base 11 includes: a base main body 32 that extends at its tip end portion in a diametrical direction in the interior of a piping passage in the form of a main passage 19, and has a connector 13 formed at its base end portion; and a flange 17 that is integrally formed with the base main body 32 and fitted into the insertion hole 31.

In the base 11, a circuit board terminal 12a, which has one end portion in the form of a terminal of the connector 13 and the other end portion electrically connected to the circuit board 5, and a temperature detection terminal 12b, which has one end portion in the form of a terminal of the connector 13 and the other end portion exposed in the main passage 19, are integrally coupled with each other by means of molding formation. An intake air temperature detection element 21 for detecting the temperature of air is electrically connected by welding to the other end portion of the temperature detection terminal 12b. The intake air temperature detection element 21, being located substantially in the center of the main passage 19 outside of the measuring passage 9, is disposed in the vicinity of the flow rate detection element 2 lying in the interior of the measuring passage 9.

The flow rate measuring apparatus 1 is fixedly secured to the intake pipe 30 by means of individual mounting screws 18 at four corners of the flange 17. An O ring 14 for preventing the leakage of air from between the insertion hole 31 and the flange 17 is placed into intimate contact with a groove portion in a circumferential side surface of the flange 17.

The above-mentioned plate 10 is made of PBT (polybutylene terephthalate) for example. In the plate 10, the circuit board 5 is placed on a window-shaped frame portion 33. A planar portion 34 is connected with the frame portion 33 through a stepped portion. A groove 35 with the flow rate detection element 2 received therein is formed on the planar portion 34 at its side near the frame portion 33. The flow rate detection element 2 is electrically connected to the circuit board 5 through a wire 8 by means of wire bonding. Here, note that the electrical connection between the flow rate detection element 2 and the circuit board 5 may be carried out by means of welding, soldering or the like.

The above-mentioned flow rate detection element 2 has a surface that forms part of a wall of the measuring passage 9 together with the plate 10. The flow rate detection element 2 is provided with a flow rate detection resistor 3 and a temperature compensation resistor 4. The flow rate detection resistor 3 and the temperature compensation resistor 4 are formed by patterning platinum films (not shown) on a surface of an insulating plate made of silicon, ceramics, etc., at its side opposite to the wire 8.

In addition, the flow rate detection element 2 has the flow rate detection resistor 3 and the temperature compensation resistor 4 formed in combination on a substrate, but heat insulation (not shown) is performed so as to make it difficult for the heat of the flow rate detection resistor 3 to be conducted to the temperature compensating resistor 4.

The above-mentioned housing 6 is fitted into a concave portion 22 that is formed in the flange 17 of the base 11. The enclosure portion 20 of the housing 6 has a pair of position limiting portions 7 which are formed in opposition to each other and protrude in inner directions so as to cover the edges of the circuit board 5 thereby to limit or restrict the position in a heightwise direction of the circuit board 5. In addition, the enclosure portion 20 is formed along its entire circumference with an outer peripheral groove 15, and the cover 16 has its peripheral portion fitted into the outer peripheral groove 15.

Next, reference will be made to the production procedure of the flow rate measuring apparatus as constructed above on the basis of FIG. 5(A) through FIG. 9(B).

First of all, in the plate 10, after a bonding material is coated on an upper surface of the frame portion 33 and the groove 35 of the planar portion 34, the circuit board 5 and the flow rate detection element 2 are placed on the frame portion 33 and the groove 35, respectively, and then, the circuit board 5 and the flow rate detection element 2 are electrically connected to each other by using the wire 8 by means of wire bonding (FIG. 5(A) through FIG. 6(B)).

After this connection, circuit adjustments for matching are carried out in the circuit board 5 and the flow rate detection element 2.

Thereafter, a bonding material is coated on the essential portions of the base 11 of which the intake air temperature detection element 21 has been welded to the tip end portion of the temperature detection terminal 12b in another process, and the plate 10 is placed on the base 11.

Then, a bonding material is coated on the back side of the housing 6, and the housing 6 is placed on the plate 10 with one end of the housing 6 being fitted into the concave portion 22 in the flange 17. At this time, the position limiting portions 7 are in contact with the surface of the circuit board 5, whereby they restrict the position in the heightwise direction of the circuit board 5.

Subsequently, both the bonding materials on the rear surface of the plate 10 and the rear surface of the housing 6 are thermally set at the same time to integrate the base 11, the plate 10 and the housing 6 with one another, after which the other end of the circuit board terminal 12a and the circuit board 5 are electrically connected to each other by using the wire 8 by means of wire bonding (FIG. 6(C) through FIG. 8(B)).

Here, note that in this embodiment, the bonding materials of the thermosetting type are used, but bonding materials of the cold setting type may also be used. In addition, the base 11, the plate 10 and the housing 6 may be integrated with one another, for example, by welding or the like without using bonding materials.

Finally, after a sealing gel (not shown) is injected into the enclosure portion 20, a bonding material is coated on the outer peripheral groove 15, and the cover 16 is then placed on the enclosure portion 20 to close it (FIG. 8(C) through FIG. 9(B)).

The flow rate measuring apparatus 1 according to the above-mentioned embodiment is mounted on the intake pipe 30, and when the temperature of the outside air is low, the intake air in the interior of the intake pipe 30 is in a cold state, but the intake pipe 30 itself might become warm due to the thermal effect of the internal combustion engine.

However, according to the flow rate measuring apparatus 1 of this embodiment, the flow rate detection element 2 is placed on the plate 10 made of the PBT resin that is smaller in thermal conductivity in comparison with metal, so the heat of the intake pipe 30 is not easily conducted to the flow rate detection element 2 through the base 11. In addition, the circuit board 5 is also placed on the plate 10, so the heat generated from the circuit board 5 itself is not easily conducted to the flow rate detection element 2 either.

Accordingly, the flow rate of air passing through the main passage 19 can be detected more accurately without receiving the influence of the heat in an engine room outside of the intake pipe 30 due to the temperature difference in the inside and outside of the intake pipe 30 and the influence of the heat generated in the circuit board 5 itself.

In addition, the intake air temperature detection element 21 is arranged outside of the measuring passage 9 at such a location that the intake air temperature detection element 21 itself does not cause a turbulent flow of air flowing in the vicinity of the flow rate detection element 2. As a result, the flow rate measuring apparatus 1 can detect the air flow rate in an accurate manner without receiving an adverse influence due to the turbulent flow.

Moreover, the intake air temperature detection element 21 is spaced from not only the inner wall of the intake pipe 30 but also the plate 10, so the influence of the heat in the engine room and the influence of the heat of the circuit board 5 itself on the intake air temperature detection element 21 are smaller than those influences on the flow rate detection element 2, and the air temperature can be detected more accurately.

Further, the intake air temperature detection element 21 is arranged in the vicinity of the flow rate detection element 2, so an air temperature near that of the air detected by the flow rate detection element 2 can be detected.

Furthermore, when vibration is applied to the intake pipe 30, the flange 17 is put into a so-called cantilever state in which the flange 17 acts as a fixed end and the tip ends of the plate 10 and the housing 6 act as free ends, thereby causing the vibration of the plate 10 and the housing 6 around the flange 17.

Also, in this embodiment of the present invention, the concave portion 22 is formed in the flange 17 of the base 11 that is fitted into the insertion hole 31 in the intake pipe 30, and the circuit board 5 and the enclosure portion 20 of the housing 6 enclosing the flow rate detection element 2 are fitted into the concave portion 22.

Accordingly, the wire 8 electrically connecting between the circuit board terminal 12a and the circuit board 5 is arranged at a side near the flange 17 that acts as a fulcrum of vibration, so the stress of the wire 8 due to the vibration is reduced, so a break or disconnection of the wire 8 can be prevented, thus making it possible to improve the reliability of the electrical connection between the circuit board terminal 12a and the circuit board 5.

In addition, as can be seen from FIG. 5(A) through FIG. 9(B), in the flow rate measuring apparatus 1, the base 11, the plate 10, the circuit board 5, the housing 6 and the cover 16 are assembled with one another while being all placed on the same side or in the same direction, so the relative positioning or alignment among the individual component parts as well as the mechanization of the production processes can be made easy, and the stabilization of quality and the cost reduction of products can be made.

Embodiment 2

Figure 10:
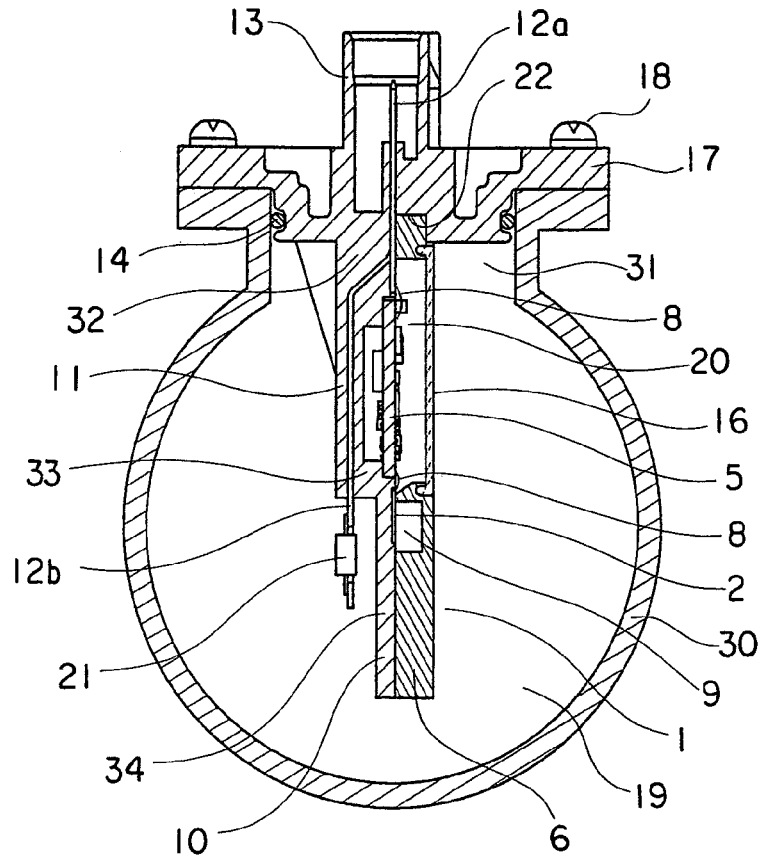
FIG. 10 is a cross sectional side view showing a flow rate measuring apparatus according to a second embodiment of the present invention.
Figure 11:
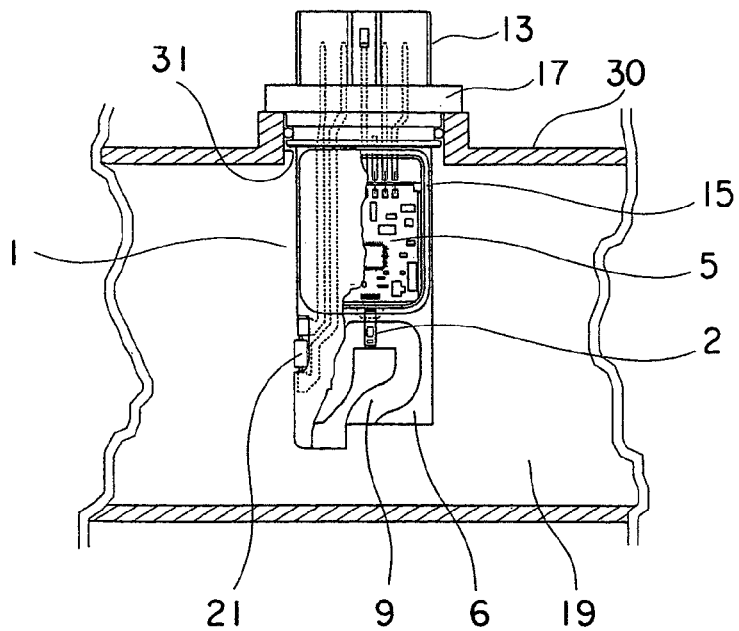
FIG. 11 is a partially cut-away front elevational view of the flow rate measuring apparatus of FIG. 10.

FIG. 10 is a cross sectional side view that shows a flow rate measuring apparatus 1 according to a second embodiment of the present invention, and FIG. 11 is a partially cut-away front elevational view of the flow rate measuring apparatus 1 of FIG. 10.

In the second embodiment of the present invention, a base 11 and a plate 10 are integrally formed with each other by the use of the same PBT resin. The other construction of this second embodiment is similar to that of the first embodiment.

According to the flow rate measuring apparatus of this second embodiment, advantageous effects similar to those of the first embodiment can be achieved. In addition, the process of positioning or aligning the plate 10 and the base 11 with each other becomes unnecessary, and at the same time, based on the thus integrated component parts of the plate 10 and the base 11, it is possible to assemble the respective component parts including the circuit board 5, the housing 6 and the cover 16, so the positional accuracy between the respective component parts can be improved.

Embodiment 3

Figure 12:
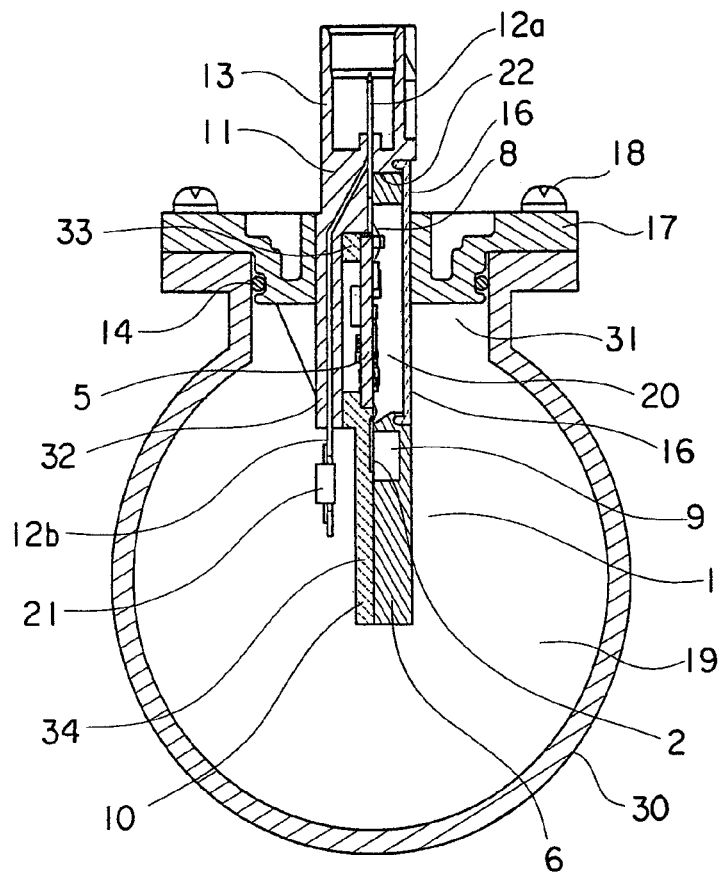
FIG. 12 is a cross sectional side view showing a flow rate measuring apparatus according to a third embodiment of the present invention.
Figure 13:
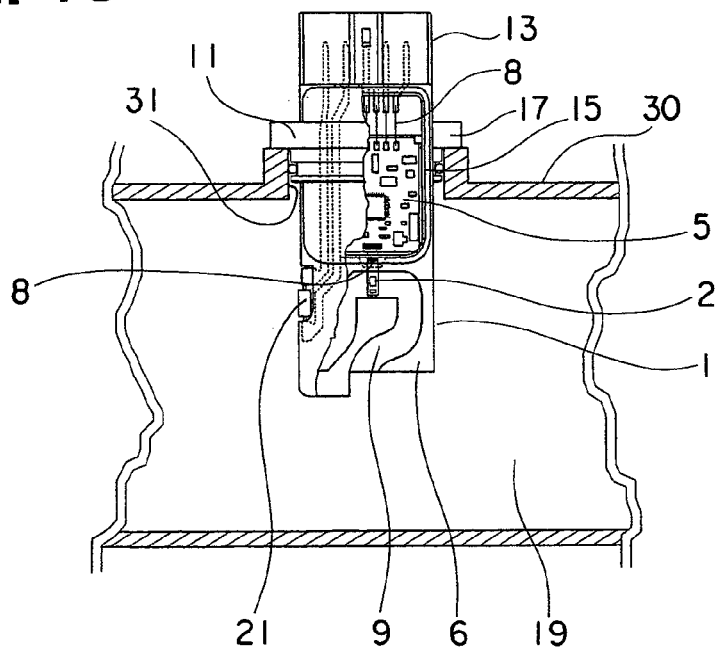
FIG. 13 is a partially cut-away front elevational view of the flow rate measuring apparatus of FIG. 12.

FIG. 12 is a cross sectional side view that shows a flow rate measuring apparatus 1 according to a third embodiment of the present invention, and FIG. 13 is a partially cut-away front elevational view of the flow rate measuring apparatus 1 of FIG. 12.

In this third embodiment of the present invention, a base main body 32 of a base 11 and a flange 17 are formed as separate members, respectively. The base main body 32, a plate 10, a circuit board 5, a housing 6 and a cover 16, which are laminated one over another, have their relative positions to the flange 17 located at a radially outer side thereof in comparison with the first embodiment. The other construction of this third embodiment is similar to that of the first embodiment.

In this third embodiment, the same effects as those in the first embodiment can be achieved, and the wire 8 electrically connecting between the circuit board terminal 12a and the circuit board 5 is arranged at a fixed side of the vibration of the flow rate measuring apparatus 1, so the stress of the wire 8 due to the vibration can be further reduced as compared with the first embodiment, and the reliability of the electrical connection between the circuit board terminal 12a and the circuit board 5 can be further improved.

Embodiment 4

Figure 14:
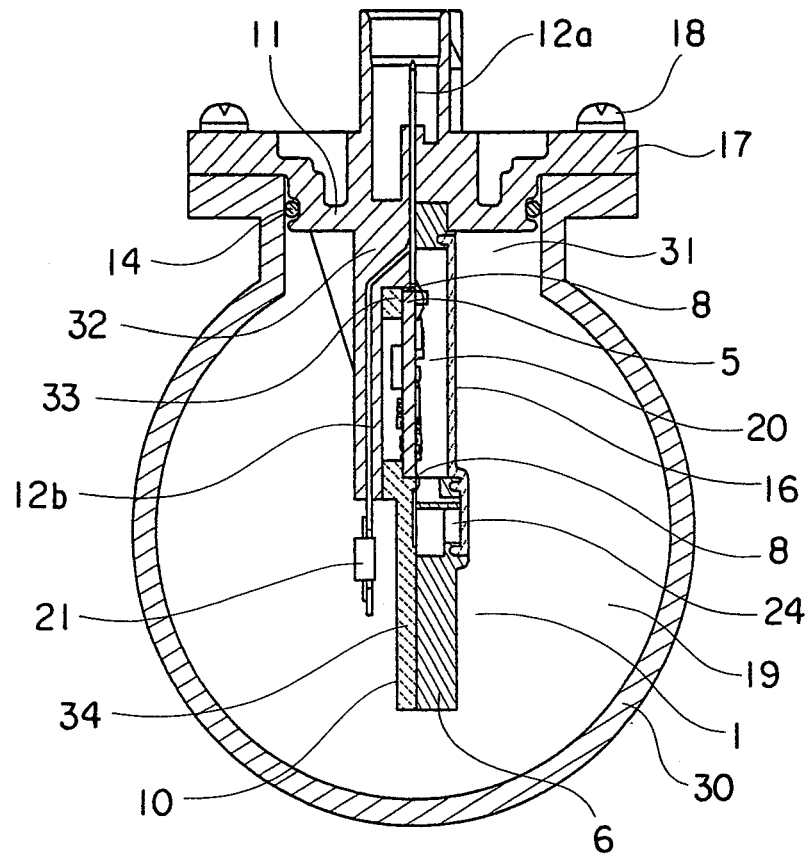
FIG. 14 is a cross sectional side view showing a flow rate measuring apparatus according to a fourth embodiment of the present invention.
Figure 15:
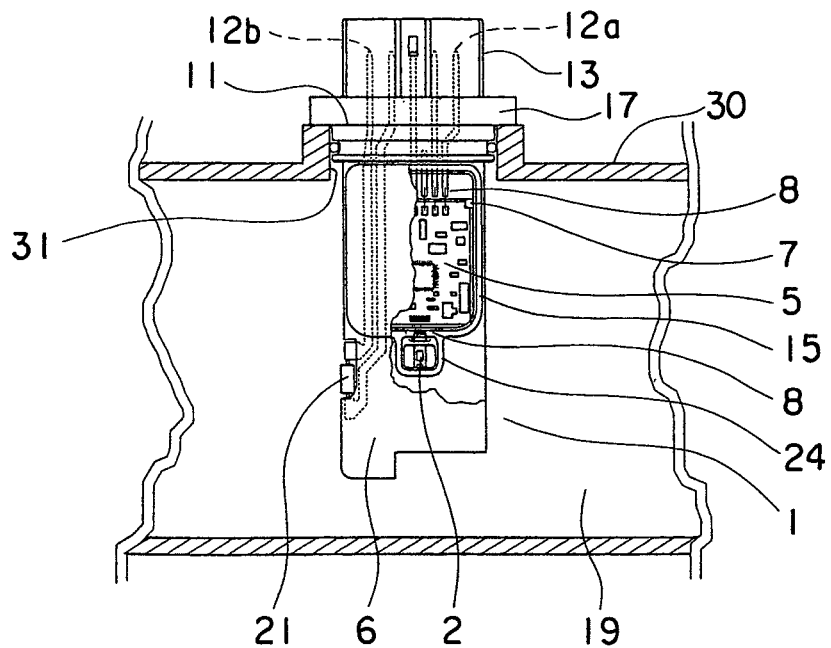
FIG. 15 is a partially cut-away front elevational view of the flow rate measuring apparatus of FIG. 14.
Figure 16:
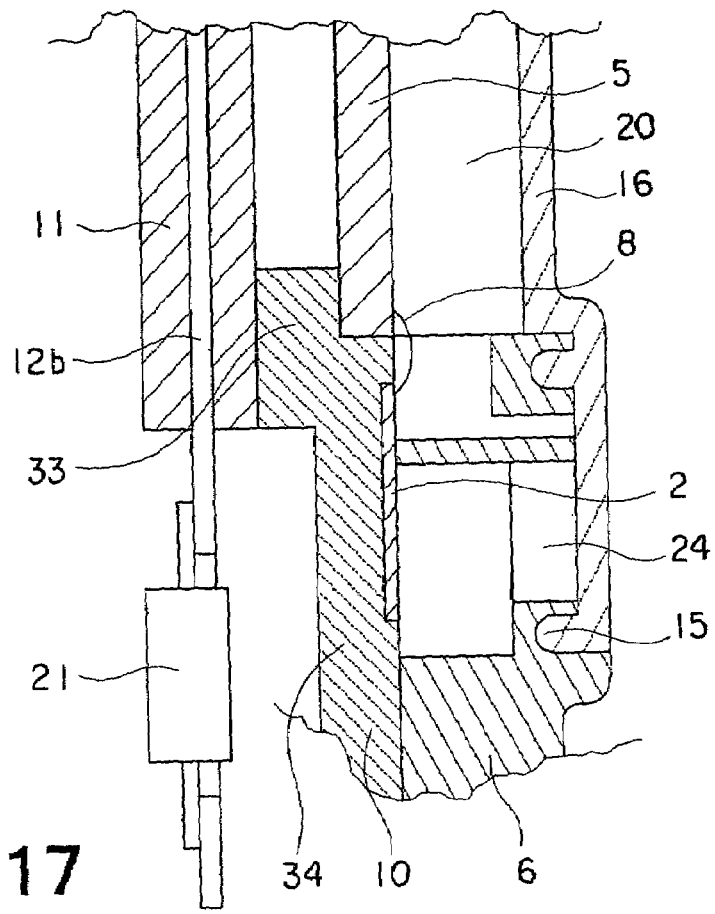
FIG. 16 is an enlarged view of essential portions of the flow rate measuring apparatus of FIG. 14.
Figure 17:
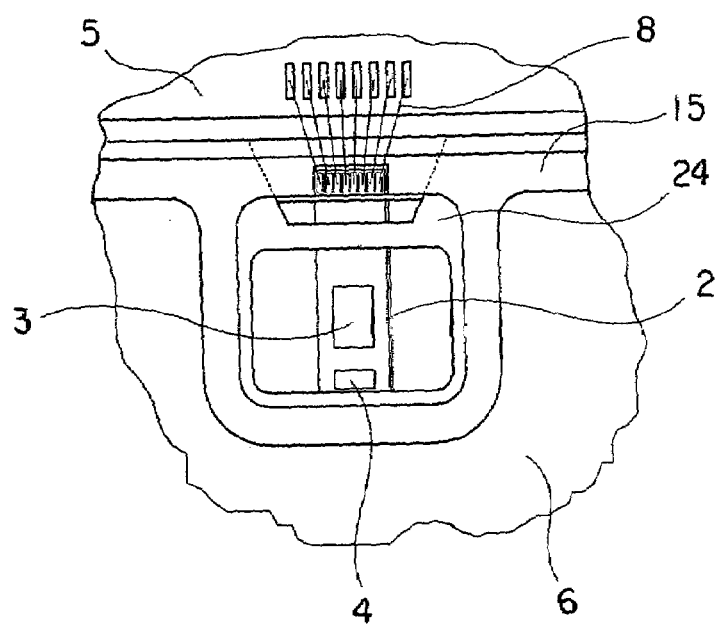
FIG. 17 is an enlarged view of essential portions of the flow rate measuring apparatus of FIG. 15.

FIG. 14 is a cross sectional side view that shows a flow rate measuring apparatus 1 according to a fourth embodiment of the present invention, and FIG. 15 is a partially cut-away front elevational view of the flow rate measuring apparatus 1 of FIG. 14. FIG. 16 is an enlarged view of essential portions of the flow rate measuring apparatus 1 of FIG. 14, and FIG. 17 is an enlarged view of essential portions of the flow rate measuring apparatus 1 of FIG. 15.

In this fourth embodiment of the present invention, a through opening 24 is formed in a housing 6 at a location opposing to a flow rate detection element 2. The through opening 24 and an enclosure portion 20 are covered with a cover 16. The other construction of this fourth embodiment is similar to that of the first embodiment.

In the flow rate measuring apparatus 1 shown in the first embodiment, in a state thereof shown in FIG. 8(A), i.e., when the housing 6 is placed on and bonded to the plate 10 by the use of the bonding material, there might happen that the bonding material protrudes to the measuring passage 9 to reach even a surface of the flow rate detection element 2.

In contrast to this, in this fourth embodiment, after attaching the housing 6 to the plate 10, a defective product with the bonding material protruded to the measuring passage 9 can be easily found through the through opening 24.

Although in the above-mentioned respective embodiments, there has been described the flow rate measuring apparatus 1 installed on the intake pipe 30 of the internal combustion engine, the present invention is not of course limited to such ones, but the present invention can also be applied to a flow rate measuring apparatus that is installed, for example, on an exhaust pipe of an internal combustion engine for measuring the flow rate of an exhaust gas discharged from the internal combustion engine.

In addition, although the plate 10 is made of PBT resin, the present invention is not of course limited to such one, but there may be used other resins which are excellent in thermal resistance and electrical insulation and low in thermal conductivity.

While the invention has been described in terms of preferred embodiments, those skilled in the art will recognize that the invention can be practiced with modifications within the spirit and scope of the appended claims.

What is claimed is:

1. A flow rate measuring apparatus which is installed on piping by insertion thereof into an insertion hole formed in said piping for measuring a flow rate of fluid to be measured that passes through a piping passage defined in said piping, said apparatus comprising:

a base that has a base main body which is formed at its base end portion with a connector protruding to an outside of said piping, and a flange which is formed on said base main body and is fitted into said insertion hole;

a plate that is made of resin and is attached to said base main body along a direction of flow of said fluid to be measured;

a flow rate detection element that is formed on said plate so as to be exposed therefrom for detecting the flow rate of said fluid to be measured;

a circuit board that is arranged on said plate at a side thereof near said connector and has a control circuit built therein for driving said flow rate detection element to process a signal of said flow rate detection element;

a housing that is attached to said plate and is formed respectively with a fluid passage groove to cooperate with said plate to form a measuring passage which serves to guide said fluid to be measured and in which said flow rate detection element is disposed;

wherein said housing is also formed with an enclosure portion which encloses said circuit board and a cover that closes said enclosure portion, and wherein said circuit board is recessed within said plate.

2. The flow rate measuring apparatus as set forth in claim 1, wherein said base has said base main body and said flange which are formed of separate members, respectively.

3. The flow rate measuring apparatus as set forth in claim 1, wherein said base is integrally formed with said plate by means of molding formation.

4. The flow rate measuring apparatus as set forth in claim 1, wherein a through opening is formed in said housing at a location opposing to said flow rate detection element, and said through opening is closed by said cover.

5. The flow rate measuring apparatus as set forth in claim 1, wherein said enclosure portion of said housing has position limiting portions which protrude in inner directions so as to cover edges of said circuit board thereby to restrict the position of said circuit board.

6. The flow rate measuring apparatus as set forth in claim 1, wherein said base has a temperature detection terminal, which has one end portion in the form of a terminal of said connector and the other end portion exposed in said main passage outside of said measuring passage, and an intake air temperature detection element for detecting the temperature of said fluid to be measured is arranged at the other end portion of said temperature detection terminal.

7. The flow rate measuring apparatus as set forth in claim 1, wherein said base has a circuit board terminal which has one end portion in the form of a terminal of said connector and the other end portion electrically connected to said circuit board, and electrically connected portions of said circuit board terminal and said circuit board are arranged at their sides near said flange.

8. The flow rate measuring apparatus as set forth in claim 1, wherein said enclosure portion is fitted into a concave portion formed in said flange.

9. The flow rate measuring apparatus as set forth in claim 1, wherein said piping is an intake pipe of an internal combustion engine, and said fluid to be measured is air.

* * * * *